Oct. 20, 1970   J. D. CRESWELL   3,534,614
SAMPLING DEVICE FOR LIQUID METAL
Filed Sept. 30, 1968

INVENTOR
John D. Creswell
BY
Watson, Cole, Grindle & Watson
Attorneys

:::
United States Patent Office 3,534,614
Patented Oct. 20, 1970

3,534,614
SAMPLING DEVICE FOR LIQUID METAL
John D. Creswell, Dronfield, Sheffield, England, assignor to Land Pyrometers Limited
Filed Sept. 30, 1968, Ser. No. 763,794
Claims priority, application Great Britain, Oct. 7, 1967, 45,971/67
Int. Cl. G01n 1/10
U.S. Cl. 73—425.6          10 Claims

ABSTRACT OF THE DISCLOSURE

A sampling device for liquid metal comprises a length of cardboard tube constituting a holder, an evacuated glass tube held over part of its length in the holder tube, e.g., by being a force fit in the tube or by cement, and a further length mounted in similar manner on the glass tube end-to-end with the holder tube and leaving one end of the glass tube exposed.

---

The invention concerns a device for taking quick samples of liquid metal, particularly of liquid steel for analysis. Modern methods of steel making demand increased speed of analysis and speedy sampling is a help to this end.

One well-known method of sampling consists of dipping into a spoon of the liquid metal extracted from the furnace the tip of an evacuated glass tube. When the tube is dipped into the liquid metal the end melts or fractures allowing the liquid metal to be forced into the evacuated tube by atmospheric pressure. The result is a clean pin of metal in a form eminently suited to analysis. A drawback of this method is that the sample obtained may not be truly representative of the metal to be analyzed, because of the opportunity for a significant change to take place, as by the escape of some of the content of dissolved gases from the metal in the sampling spoon.

A known development of this method is to enclose a sampling tube made of fused silica in a cardboard sheath attached to a tubular arm, with the tip of the silica tube protruding a few millimetres from the cardboard and covered with a thin metal cap. This allows the sampling tube to be plunged into the metal whether it be in the furnace, the ladle, the mould, or elsewhere, and a sample is obtained which is truly representative of the metal in, for example, the furnace without significant change in the content of dissolved gases which can escape from the sampling spoon in the method as first developed. In this development, a silica tube has been substituted for the glass tube. If glass were used the protruding end of glass would melt away and the sample would not be accessible for quick removal. The use of silica, which melts at a high temperature, results in a small length of sample, enclosed in the silica tip, being left protruding so that the sample can be extracted, for example with a pair of pliers.

The disadvantages of this development lie first in the use of silica, which is expensive, and second in the need to seal the end of the silica tube with glass since silica would not melt or crack in the steel to allow the metal to enter the tube. The sealing process using glass is difficult and expensive to carry out, and the use of this development has therefore been limited to certain special applications in which the high costs is not a prohibitive disadvantage. Furthermore, even with this construction it is not always easy or possible to extract the sample from the tube because the silica may have softened or the metal partially melted away during withdrawal of the sample so that no protruding end of the sample is accessible.

The object of the invention is to provide a form of sampling device capable of taking a sample quickly and easily directly from the melting furnace or other container of liquid metal into an inexpensive glass tube.

According to the present invention, a sampling device for liquid metal comprises a length of cardboard tube constituting a holder, an evacuated glass tube held over part of its length in the holder tube, and a further length of cardboard tube held on the glass tube end to end with the holder tube and leaving one end of the glass tube exposed.

The device is plunged into the liquid metal sufficiently for the exposed end of the glass tube, which is preferably borosilicate glass, to be melted by the metal, for metal to be sucked into the glass tube, the cardboard tubes providing protection for the glass tube from the hot atmosphere (which may be a furnace atmosphere) above the metal and from the metal itself during the short period of immersion. The glass of the tube shatters from thermal shock, and the cardboard tube providing for exposure of the end of the glass tube can be twisted and pulled away from the holder tube, to withdraw from the latter the metal pin that has been formed directly from the liquid metal.

Preferably, a short length of the glass tube back from the end is exposed for ready melting on exposure to the liquid metal; and protection of the exposed length of tube can be provided by a metal cap, as already described, during passage through the atmosphere above the metal and through any slag layer, the metal tube then melting to allow the tip of the glass tube to be melted.

Advantageously, the evacuated tube may contain a small amount of aluminium or other deoxiding material, say 1% by volume, to react with excess dissolved oxygen in the liquid metal, and to prevent the evolution of oxygen during the cooling process. The surface of aluminium should be clean and free from oxide coating to ensure rapid reaction.

The glass tube may be secured in the cardboard tubes by means of cement, in which case it is advantageous to provide an interface of mechanical weakness between the cement attaching it to the holder tube and the cement attaching it to the other tube by allowing the first cement to harden before adding the second. To ensure correct alignment of the two cardboard tubes a lining tube may be secured in, and protruding from the holder tube so that the other tube may be slipped over it. The other tube then contains the second cement, which may also be used to secure the metal cap.

The use of cement is advantageous in that it makes unnecessary close tolerances between the dimensions of the glass tube and the cardboard tubes for the former to be gripped by the latter, and thus allows different diameters of sampling tube to be accommodated easily.

The invention will be further clarified on reading the following description in conjunction with the drawing in which.

Figures 1, 2, 3:
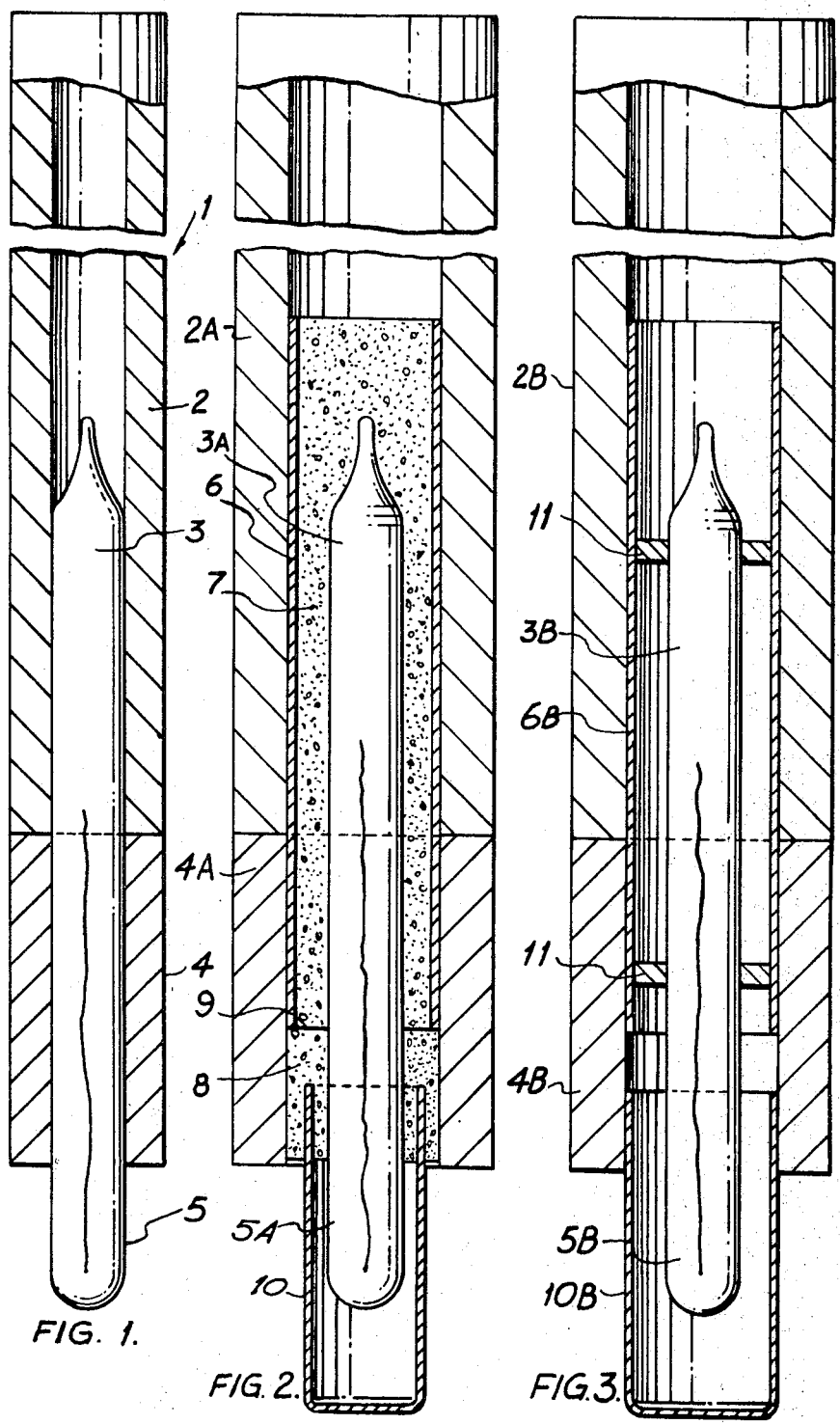
FIG. 1 is an elevation in section of a sampling device in accordance with this invention.
FIG. 2 is an elevation in section of a second embodiment of the invention.
FIG. 3 is an elevation in section of still a third embodiment of the invention.

In its simplest form, a sampling device 1 (FIG. 1), is formed from a length of cardboard tube 2 constituting a holder, an evacuated borosilicate glass tube 3 held over part of its length in the holder and a further length of cardboard tube 4 mounted on the glass tube, leaving the end portion 5 of the glass tube exposed. Thus, with the holder tube 2 long enough to be held in the gloved hand or attached to an elongated metal rod or tube (not shown) which may have a tapered end to be pushed into the end of the holder tube, the device is plunged into the liquid metal sufficiently for the end 5 of the glass tube to be melted, for metal to be sucked into the glass tube. The cardboard provides adequate protection for the glass tube from the hot atmosphere (e.g., furnace atmosphere) above the metal and from the metal itself during the short period of immersion. The metal entering the glass tube thermally shocks it such that it shatters, and the cardboard tube 4 can simply be twisted and pulled away from the holder tube 2 to withdraw the metal pin that has been formed directly from the liquid metal.

Alternatively, as is shown in FIG. 2, a cardboard holder tube 2A and a further length of cardboard tube 4A have an inner diameter and that is larger than the outer diameter of the glass tube 3, and the two cardboard tubes 2A, 4A, are kept aligned by a lining tube 6, attached to the holder tube 2A, but not attached to the other tube 4A. The lining tube 6 is a convenience in assembly, because the glass tube 3A is first cemented into it and the cement 7 is allowed to set, after which the lining tube 6 is fixed firmly in the holder tube. The other and shorter cardboard tube is put on and the remainder of the cement 8 is added. The double cementing procedure forms a surface of weakness 9 between the two halves of the cement which is helpful in the operation of the device. Before the cement sets in the shorter tube, the opend end of a metal cap 10 is pressed into the cement, so that the cap protects the protruding end 5A of the glass tube.

The operation of the sampling device with the cemented glass tube is as follows. The capped end is plunged into the liquid metal and left immersed for a few seconds to allow the metal cap 10 to melt and the liquid metal to penetrate into the glass tube. The device is then withdrawn and the shorter cardboard tube 4A is twisted and pulled away from the holder tube 2A. The glass tube 3A has shattered due to thermal shock, and consequently breaks easily, and the surface of weakness 9 in the cement allows the end to come away from the holder tube without difficulty. The end 5A of the glass tube expoed to the metal becomes fused and with the metal and the cement now forms a firm anchorage by which the sample is attached to the short cardboard tube 4A. Consequently a clean pin of metal, firmly attached to the short cardboard tube, is easily withdrawn from the shattered glass tube and is immediately available as a sample.

In a further alternate construction as is shown by FIG. 3, a cardboard holder tube 2B and further tube 4B have an inside diameter larger than the outside diameter of the glass tube 3B, a lining tube 6B keeping the two tubes in alignment. As was the case with the construction shown in FIG. 2, the lining tube 6B is attached to the holder tube 2B, but not to the other tube 4B. The liner tube is again a convenience in assembly, in this case the glass tube being secured by washers 11 centrally of the liner tube. A metal cap 10B is pushed into the open end of the tube 4B to protect the protruding end 5B of the glass tube.

As was the case with the construction shown in FIG 2, the capped end is plunged into the liquid metal, when the cap 10B melts and the liquid metal penetrates into the glass tube, and after withdrawal of the device, the shorter cardboard tube 4B is twisted and pulled away from the holder tube 2B to withdraw the pin of metal, the end 5B having become fused and with metal frozen in the open end of the tube 4B, formed a firm anchorage by which the sample is attached to the tube 4B.

In all FIGS. 1 to 3, a length of aluminium wire 12 is provided within the glass tube to react with excess dissolved oxygen in the liquid metal and to prevent the evolution of oxygen during the cooling of the pin.

The following indications of suitable materials and dimensions are given purely by way of example:

The evacuated glass tube is conveniently about 6 mm. inside diameter with a minimum wall thickness ¾ mm., and overall length 4″ or 6″.

The holder tube 2 of FIG. 1 has a ¼″ wall thickness and an inside diameter such as to be a tight fit on the glass tube 3, the other tube 4 being generally similar but only about 1″ in length. The holder tubes 2A and 2B of FIGS. 2 and 3 have a ¼″ wall thickness and an inside diameter of 11/16″, to give a tight fit on the lining tube 6 or 6B, of a length somewhat shorter than the glass tube. The other cardboard tube is again generally similar to the holder tube, but only about 1″ in length, and a good push fit on the lining tube.

The protective metal cap may be of thin steel, copper, or aluminium.

What I claim is:

1. A sampling device for liquid metal comprising a length of cardboard tube constituting a holder, an evacuated glass tube held over part of its length in the holder tube, and a further length of cardboard tube mounted on the glass tube end-to-end with the holder tube to leave one end of the glass tube exposed.

2. A sampling device as in claim 1, wherein a short length of the glass tube back from the end is exposed for ready melting on exposure to the liquid metal.

3. A sampling device as in claim 2, wherein a metal cap protects the exposed length of tube.

4. A sampling device as in claim 1, wherein the evacuated tube contains a small amount of aluminium or other deoxidising material.

5. A sampling device as in claim 1, wherein the glass tube is a force fit inside the holder tube and the further length of tube.

6. A sampling device as in claim 1, wherein the glass tube is secured in the cardboard tubes by means of cement.

7. A sampling device as in claim 6, wherein an interface of mechanical weakness is provided between the cement attaching the glass tube to the holder tube and the cement attaching the glass tube to said further tube by allowing the first cement to harden before adding the second.

8. A sampling device as in claim 6 wherein to ensure correct alignment of the two cardboard tubes a lining tube is secured in, and protrudes from the holder tube so that said further tube may be slipped over said lining tube.

9. A sampling device as in claim 1, wherein the glass tube is secured in a lining tube by washers surrounding the glass tube, the lining tube being secured in the holder tube and said further tube slipped on said lining tube.

10. A sampling device as in claim 1, wherein the glass tube is of borosilicate glass.

References Cited

UNITED STATES PATENTS

| | | | |
|---|---|---|---|
| 2,858,351 | 10/1958 | Taylor | 136—234 |
| 3,288,654 | 11/1966 | Perrin et al. | 136—234 |
| 3,313,159 | 4/1967 | Vanderbeak | 73—423 |
| 3,369,406 | 2/1968 | Lowdermilk | 73—425.6 |
| 3,415,124 | 12/1968 | Collins | 73—425.4 |

S. CLEMENT SWISHER, Primary Examiner